United States Patent
Hurtta

(10) Patent No.: US 7,672,312 B1
(45) Date of Patent: Mar. 2, 2010

(54) CONNECTION RELEASE IN A TWO-LAYER COMMUNICATION NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 1868 days.

(21) Appl. No.: 10/398,582

(22) PCT Filed: Oct. 9, 2000

(86) PCT No.: PCT/EP00/09885

§ 371 (c)(1),
(2), (4) Date: Oct. 14, 2003

(87) PCT Pub. No.: WO02/32166

PCT Pub. Date: Apr. 18, 2002

(51) Int. Cl.
*H04L 12/28* (2006.01)

(52) U.S. Cl. .................................. 370/395.41

(58) Field of Classification Search ................. 370/230, 370/231, 310, 328, 338, 352, 392, 465, 227, 370/235, 329, 394, 310.1, 395.2, 395.21, 370/395.3, 395.41, 468, 229; 455/445; 709/206, 709/225, 226, 227, 228, 229, 230
See application file for complete search history.

(56) References Cited

U.S. PATENT DOCUMENTS

| | | | |
|---|---|---|---|
| 5,953,328 A | | 9/1999 | Kim et al. |
| 6,104,929 A | * | 8/2000 | Josse et al. .................. 455/445 |
| 6,128,348 A | * | 10/2000 | Kao et al. .................... 375/260 |
| 6,615,269 B1 | * | 9/2003 | Suumaki et al. ............. 709/230 |
| 6,621,793 B2 | * | 9/2003 | Widegren et al. ........ 370/230.1 |
| 6,728,208 B1 | * | 4/2004 | Puuskari .................. 370/230.1 |
| 6,813,638 B1 | * | 11/2004 | Sevanto et al. .............. 709/227 |
| 6,937,566 B1 | * | 8/2005 | Forslow ....................... 370/231 |
| 6,956,832 B1 | * | 10/2005 | Muhonen et al. ............ 370/310 |
| 7,027,417 B1 | * | 4/2006 | Verkama et al. ............. 370/329 |
| 7,054,268 B1 | * | 5/2006 | Parantainen et al. ........ 370/231 |

(Continued)

FOREIGN PATENT DOCUMENTS

EP    1 014 619 A1    6/2000

(Continued)

OTHER PUBLICATIONS

3G TS 23.060 V3.4.0, "*3rd Generation Partnership Project; Technical Specification Group Services and System Aspects; General Packet Radio Service (GPRS); Service Description; Stage 2 (Release 1999)*", Jul. 2000, pp. 1-188.

(Continued)

*Primary Examiner*—William Trost, IV
*Assistant Examiner*—Raj Jain
(74) *Attorney, Agent, or Firm*—Mintz, Levin, Cohn, Ferris, Glovsky and Popeo, P.C.

(57) ABSTRACT

The present invention is a method for releasing at least a part of a connection in a two-layer communication network that includes a first communication network layer adapted to establish or which establishes a communication channel to a terminal, and a second communication network layer adapted to establish or which establishes an application layer connection. The method includes deciding in one of the first and second communication network layers that at least the part of the connection associated with the terminal is to be released, and forwarding the decision from the one of the communication network layers in which the decision has been taken, to the other of the communication network layers via an interface between the first and second communication network layers.

15 Claims, 3 Drawing Sheets

U.S. PATENT DOCUMENTS 7,310,671 B1 * 12/2007 Hassell et al. ............... 709/225

FOREIGN PATENT DOCUMENTS

| JP | 08-186578 | 7/1996 |
| JP | 09055764 | 2/1997 |
| JP | 11163946 | 6/1999 |
| KR | 2000-0025928 | 5/2000 |
| WO | WO 99 22568 A | 5/1999 |
| WO | WO 99/48310 | 9/1999 |
| WO | WO 99/61966 | 12/1999 |
| WO | WO 00/01173 | 1/2000 |
| WO | WO 00/24209 | 4/2000 |

OTHER PUBLICATIONS

3GPP2 P.S0001 Version 1.0, "*3rd Generation Partnership Project 23GPP2*" Wireless IP Network Standard, Dec. 10, 1999, pp. 1-50.

Simpson, W., "*The Point-to-Point Protocol*", RFC 1661, Jul. 1994, pp. 1-45.

Young, Ray, "*Wireless IP-Internet Without Wires*", Office of the Manager National Communications System, Technical Notes vol. 7, No. 4, Aug. 2000, pp. 1-6.

Zimmermann, Hubert, "*OSI Reference Model-The ISO Model of Architecture for Open Systems Interconnection*" IEEE vol. com. 28, No. 4, Apr. 1980, pp. 425-432.

Japanese Office Action 2007-002176 dated Jul. 17, 2008 with translation.

* cited by examiner

CONNECTION RELEASE IN A TWO-LAYER COMMUNICATION NETWORK

BACKGROUND OF THE INVENTION

1. Field of the Invention

The present invention relates to a method for releasing a connection in a two-layer communication network.

2. Description of the Prior Art

As used herein, a two-layer communication network means a communication network comprising a first communication network layer adapted to establish or which establishes a communication channel to a terminal communicating in a call and transmitting the call, and a second communication network layer adapted to establish or which establishes the call. An application layer as used herein means a set of security mechanisms, files, data and protocols (excluding transmission layer protocols). A call as used herein means a logical association between at least two users. A communication channel as used herein means a logical connection in the transmission layer between at least two end-points (for example between a mobile terminal and a support node). Of course, the present invention is not limited to voice calls, but the expression call is intended to represent a subset of sessions.

A terminal may be any communication end-point which is adapted to send or which sends and/or adapted to receive which receives data via a communication channel. In particular, a terminal can be a wireless terminal, or a terminal communicating via wires. Examples of terminals are radio terminals also referred to as a mobile station MS, or a user equipment UE (terminal conforming to UMTS standards also known as third generation (3G) terminal), or a server device.

FIG. 1 shows an example of a basic network architecture for a two-layer communication network. The illustrated example is given with reference to a UMTS/GPRS network as a first communication network layer adapted to establish or which establishes a communication channel to a terminal (UE) communicating in a call and transmitting the call, and an Internet Protocol based IP network as a second communication network layer adapted to establish or which establishes a call (for example Internet Protocol Telephony IPT). However, networks operated according to other standards may be chosen while the applicability of the present invention will not substantially be influenced thereby.

A user equipment UE as a terminal communicates with and/or via the communication network. This means that the user equipment UE may communicate with another user equipment (not shown) or with a server entity (not shown) within or external to the communication network. An external server entity could in turn be regarded as a terminal. The party initiating the call is referred to as the caller, while the called party is referred to as the callee. The communication network shown in FIG. 1 is a two-layer communication network consisting of a GPRS/UMTS network as an example for a first communication network layer, and of an Internet Protocol based (IP) network as an example for a second communication network layer. Between the first and second communication network layers at least one interface I/F is present. In the illustrated case, a network functional entity known as Policy Control Function (PCF) constitutes the interface. Nevertheless, the interface may be provided directly between the network layers, that is between respective nodes thereof. In such a case, and with reference to the illustrated example, the interface would be provided between the Gateway GPRS Support Node GGSN and the Call State Control Function CSCF (sometimes also referred to as proxy-CSCF). The CSCF in turn is adapted to communicate or which communicates with other functional entities and elements of the IP network such as for example a home subscriber server HSS, etc. (not shown).

Upon a call, the user equipment communicates via a Packet Data protocol (PDP) context. For the PDP context, a radio bearer (RB) is established between the user equipment UE and a Node_B of a radio access network RAN of the GPRS/UMTS network layer. A Node_B corresponds to a base station in a GSM network. The Node_B is under control of a Radio Network Controller RNC which corresponds to a base station controller BSC in GSM. Of course, a radio access network generally comprises a plurality of Node_B elements. For simplicity of the drawings, however, only one Node_B has been illustrated. An example for such a radio access network is UTRAN (UMTS Terrestrial RAN).

The radio access network RAN as an example for the access network (a non-radio access network (that is wired/fixed access network is also conceivable) is connected to a core network CN. A core network denotes the part of the GPRS/UMTS network which is independent of the connection technology of the terminal UE. In the illustrated example, the core network is a GPRS (General Packet Radio Service) core network. The core network comprises a Serving GPRS Support Node (SGSN) and a Gateway GPRS Support Node GGSN, which nodes are known as such and a detailed description thereof is therefore not necessary.

It is assumed that the terminal and/or user equipment UE/MS communicating with/via the above briefly outlined communication network has subscribed to GPRS.

Such a GPRS subscription contains the subscription of one or more PDP addresses (Packet Data Protocol). Each PDP address is described by one or more PDP contexts in the terminal (UE and/or MS), the SGSN and the GGSN. Each PDP context may be associated with a TFT (Traffic Flow Template). At most one PDP context associated with the same PDP address may exist at any time with no TFT assigned to it. Every PDP context exists independently in one of two PDP states (active/inactive). The PDP state indicates whether data transfer is enabled for that PDP address (and TFT) or not. In case all PDP contexts associated with the same PDP address are deactivated, data transfer for that PDP address is disabled. All PDP contexts of a subscriber are associated with the same MM context (Mobility Management) for the IMSI (International Mobile Subscriber Identity) of that subscriber.

The inactive state characterizes the data service for a certain PDP address of the subscriber as not activated. The PDP context contains no routing or mapping information to process PDP PDUs (Protocol Data Units) related to said PDP address. No data can be transferred.

The terminal (UE and/or MS) initiates a transition from the inactive to the active state by initiating the PDP context activation procedure.

In the active state, the PDP context for the PDP address in use is activated in the terminal MS, the SGSN and GGSN. The PDP context contains mapping and routing information for transferring PDP PDUs for said particular PDP address between the terminal (MS) and the GGSN. The active PDP state is permitted only when the mobility management state of the subscriber is standby, ready, PMM-idle or PMM-connected. The Iu interface radio access bearer (RAB) may or may not be established for an active PDP context.

An active PDP context for a terminal (MS) is transferred to inactive state when the deactivation procedure is initiated.

At call release of a call of a terminal having subscribed to a GPRS network and communicating with/via the network, there occur situations in which the call is terminated, but the PDP contexts are still active. In such a case, data packets may still be tried to be transmitted to or from the PDP address associated to the still active PDP context.

As the charging of a service for a subscriber may be based on the amount of data transmitted to and from him, or on the time during which the PDP context is active, such a situation is undesirable for a subscriber in that the subscriber will be charged for data services not actually used and/or received.

Also, as the GPRS network is only enabled to serve a limited number of subscribers, i.e. forward data to a limited number of addresses for which PDP contexts are in an active state, such a situation is undesirable in terms of a waste of communication network resources, as other subscribers could be blocked by active PDP contexts of subscribers no longer actually participating in a call.

SUMMARY OF THE INVENTION

Consequently, the present invention provides a method for releasing a connection or part of the connection in a two-layer communication network which method prevents the occurrence of the above mentioned drawbacks.

According to the present invention, the method for releasing at least a part of a connection in a two-layer communication network comprises a first communication network layer adapted to establish or which establishes a communication channel to a terminal, and a second communication network layer adapted to establish or which establishes an application layer connection, the method comprising the steps of: deciding in one of the first and second communication network layers that at least the part of the connection associated to the terminal is to be released, and forwarding the decision from the one of the communication network layers in which the decision has been taken, to the other of the communication network layers via an interface between the first and second communication network layers.

According to further developments of the present invention, the first communication network layer is a GPRS/UMTS system;

the second communication network layer is an IP Multimedia Subsystem;

the terminal is a mobile station (MS) or a user equipment (UE);

the interface between the first and the second communication network layers is constituted by a network functional entity;

the network functional entity is a Policy Control Function (PCF);

the connection is a session;

the method further comprises the steps of releasing an established session to the terminal communicating in the session, modifying a communication channel used for the session;

the modification is a deactivation;

the modification affects at least one parameter of a set of parameters defining the connection;

the at least one parameter is the quality of service parameter "guaranteed bit rate", and the guaranteed bit rate is modified such that it is set to zero;

the modification affects charging for the communication channel;

the communication channel is represented by using a PDP context;

the connection is a session;

the method further comprises the steps of releasing or modifying the communication channel, and modifying the session carried on the communication channel;

the modification is a release;

the modification affects charging for the session;

the communication channel is represented by using a PDP context;

the method further comprises a step of requesting, by the terminal, the two-layer communication network to release the terminal from the session, and wherein the decision concerning the release is taken by the second communication network layer based on the release request from the terminal, and forwarded from the second to the first communication network layer;

the method further comprises a step of monitoring an inactivity state of the terminal by the first communication network layer, and wherein when detecting an inactivity state, the decision concerning the release is taken by the first communication network layer, and forwarded from the first to the second communication network layer;

the inactivity state is represented by a break in a radio connection.

Also, the present invention concerns a communication system comprising a terminal (UE) communicating via a connection with a two-layer communication network, the network comprising a first communication network layer adapted to establish or which establishes a communication channel to the terminal (UE) communicating in the call, and a second communication network layer adapted to establish or which establishes an application layer connection for the call, wherein the system is adapted to carry or which carries out the method steps for releasing the connection as set out above.

Thus, according to the present invention:

1) a call is released in the application layer, indicating the call release to the transmission layer, performing specific functions in the transmission layer due to the indication (for example, releasing the communication channel or including the indication to charging information.)

2) a communication channel is released (that is PDP context) or part of the communication channel (i.e. RAB) in the transmission layer, indicating this to the application layer, releasing the call in the application layer, is enabled. A connection is either a call or a PDP context or part of the PDP context (that is a RAB.)

Accordingly, the present invention provides the advantage that each of the communication network layers has a knowledge of the necessity to release a connection and is enabled to initiate suitable measures which are related to its network layer in order not to waste network capacities for a connection which is or can no longer be active.

Moreover, the terminal is relieved from the burden of caring for initiating the deactivation of the PDP contexts, as this duty has now been transferred to the network.

Further, due to the network initiating the PDP context deactivation the PDP context is insured to not be used for other purposes than the call.

The network may release, for example an IP multimedia call irrespective of whether the terminal is in a position to do that, for example if the terminal is out of coverage and/or the transmission quality (quality of service) is below a predetermined threshold level.

As a call can be released by the network automatically after a predetermined period of time, the subscriber is not be charged for data packets routed in vain to his PDP address specified by a still active PDP context.

Still further, as a terminal might try to misuse the PDP context for other traffic than the call, by modifying/deactivating the PDP context according to the present invention, such a misuse is prevented or at least detected when the present invention is implemented.

BRIEF DESCRIPTION OF THE DRAWINGS

The above and further objects and advantages of the present invention will become more fully apparent upon referring to the accompanying description of preferred embodiments in conjunction with the attached drawings, in which.

DETAILED DESCRIPTION OF PREFERRED EMBODIMENTS

The present invention will now be described in greater detail with reference to the drawings.

Figure 2:
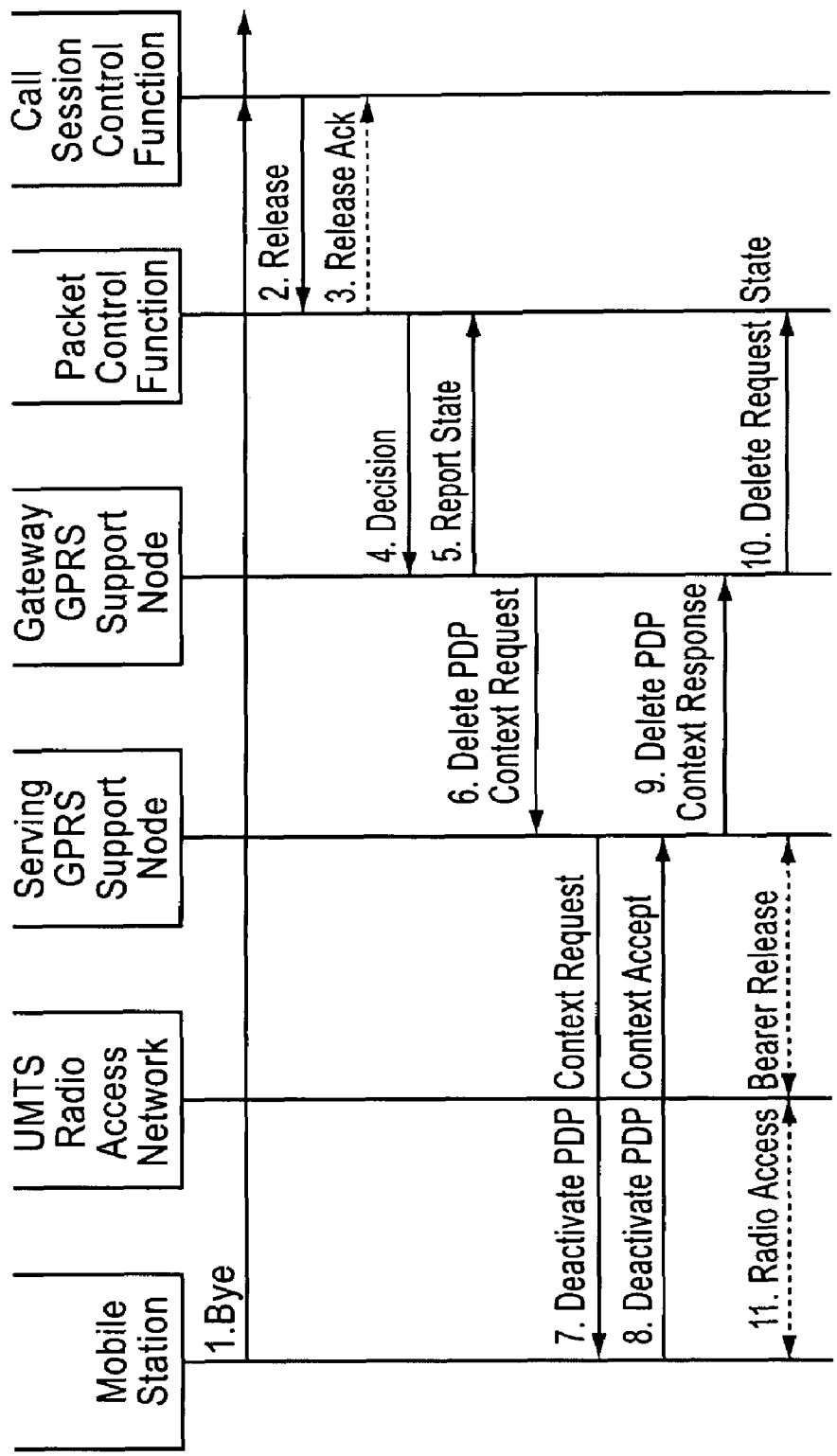
FIG. 2 illustrates a signaling scenario of a first embodiment of the present invention.
Figure 3:
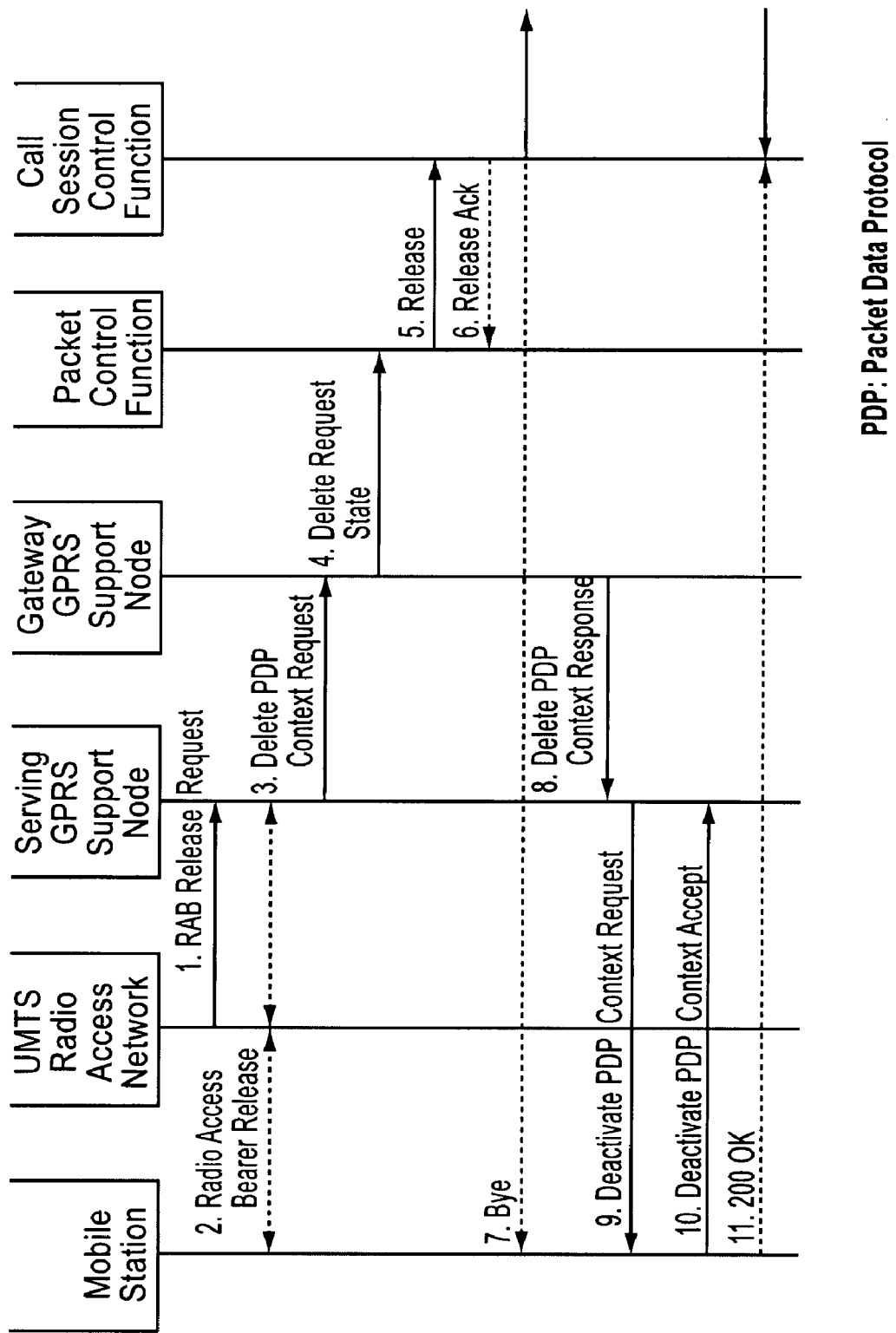
FIG. 3 illustrates a signaling scenario of a second embodiment of the present invention.

FIGS. 2 and 3, respectively, illustrate a signaling scenario of signals transmitted between individual network parts and/or network elements. The numbering of the arrows representing the signal transmission direction is representative of the consecutive transmission of the signals and/or execution of processes over time.

Figure 1:
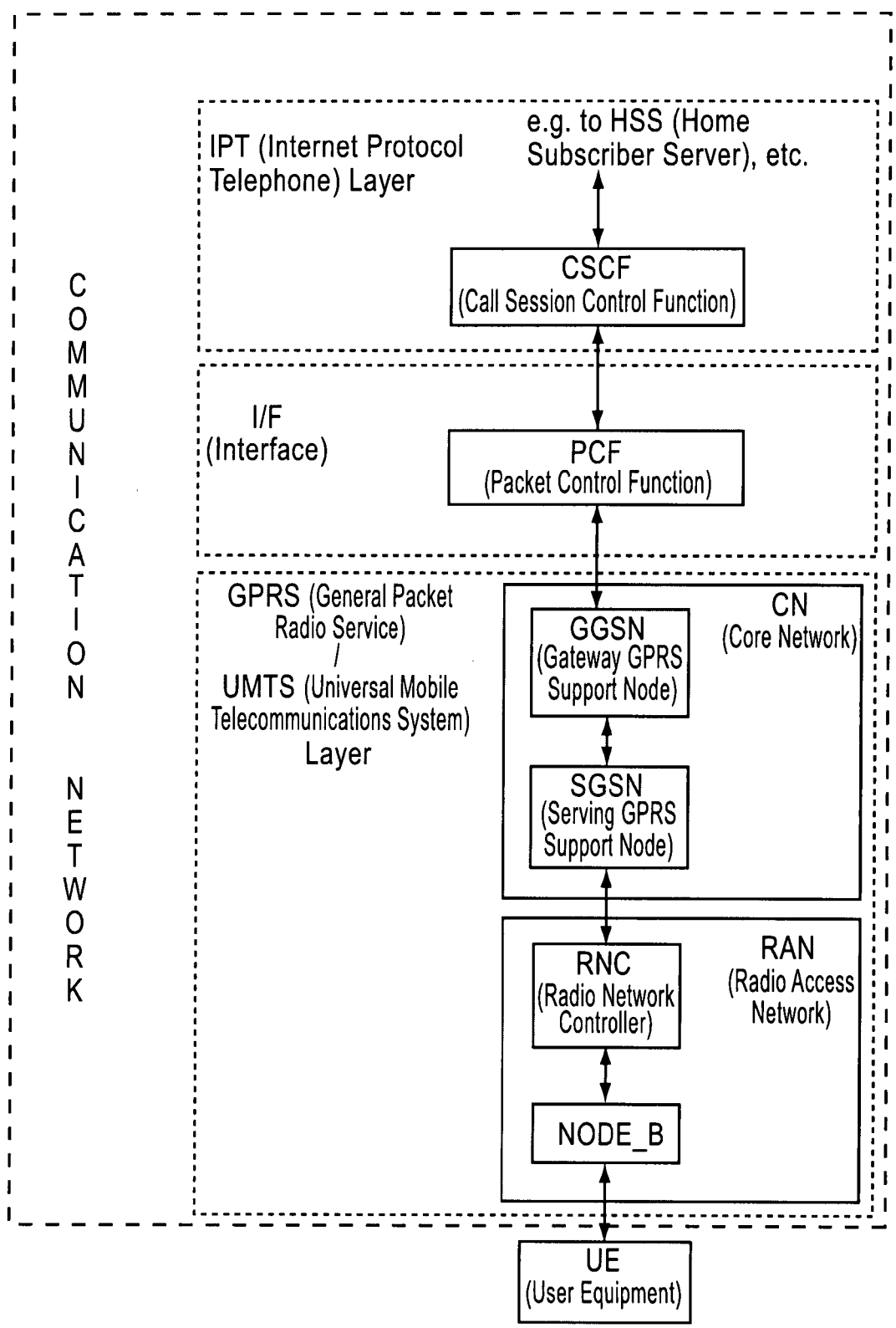
FIG. 1 shows a block circuit representation of a two-layer communication network with regard to an example of a GPRS/UMTS layer and IPT layer communication network.

The terminal (UE in FIG. 1) is represented as a mobile station MS, the radio access network RAN is represented by using UTRAN as an example radio access network, the GPRS network elements SGSN and GGSN are individually shown, the interface between the (GPRS/UMTS) first layer communication network and the (IPT) second layer communication network is represented by the PCF functional element (Policy Control Function). The IPT layer (second layer) of the two-layer communication network is represented by a proxy-CSCF as the network functional element thereof mainly involved in connection with the present invention (so that the other network elements of the IPT layer are omitted from the illustration).

The signaling scenario in connection with a first embodiment of the present invention is shown in FIG. 2.

FIG. 2 illustrates a network initiated PDP context deactivation or change in the PDP context.

In brief, the terminal MS initiates the call release. The call release is informed to the proxy-CSCF, which sends a corresponding indication to the PCF. The PCF sends the indication, i.e. a decision, to the GGSN. The GGSN, in response thereto, changes a previous decision, that is the GGSN initiates a PDP context deactivation or PDP context modification or performs a change in the PDP context upon receipt of the indication from the PCF. The change in the PDP context may affect charging. Afterwards, the GGSN sends a request to the PCF to remove the state information related to the PDP context.

Thus, upon call release, an inter network layer communication is involved, which takes place via the interface between the communication network layers.

The individual steps of the involved signaling are now explained with reference to FIG. 2.

In step #1, the MS as the terminal sends a "Bye" message. The "Bye" message is sent to the proxy-CSCF, which forwards the message towards the callee (not shown) in order to inform the communication partner terminal of the intention of the MS to terminate the call.

In step #2, the proxy-CSCF sends a "Release" message to the PCF. The PCF (Policy Control Function) constitutes the interface between the two layers of the communication network. This function ensures that users do not violate promised traffic characteristics. Thus, the task of the Policy Control Function resides in the division of available network resources in a defined manner over a set of network users competing for those resources and thus serves to enforce a connection admission policy.

In step #3, the PCF may acknowledge the receipt of the release message by sending a "Release Ack" message to the proxy-CSCF.

In step #4, the PCF sends the "Decision" message (including a request ID) to the GGSN in order to change the previous decision, that is to indicate the call release. Stated in other words, as a PDP context(s) was (were) in the active state for the ongoing call (corresponding to a previous decision to set the PDP context in the active state), the decision taken by the PCF (step #4) resides in deciding that the PDP context(s) concerned for the call are to be modified or set inactive (deactivated).

In step #5, the GGSN may report to the PCF that it has successfully completed performing the decision, that is to translate the decision into an appropriate action, by sending the "Report State" message (including the request ID) to the PCF.

In subsequent steps #6 to #9, the GGSN initiated PDP context deactivation or modification may be performed. The former case is presented in FIG. 2. The PDP context deactivation and modification are known as such, so these steps are not described in further detail. As an alternative to the PDP context deactivation or modification, the GGSN may perform a change in the PDP context. The change may affect charging for the PDP context. The functions performed may be network operator specific.

In step #10, the GGSN thereafter sends a "Delete Request State" message (including the request ID) to the PCF in order remove the request state from the PCF.

Following step #10, the radio access bearer release procedure is performed in step #11.

Note that the messages transmitted in steps #4 (decision), #5 (report state), and #10 (delete request state) can be COPS messages. COPS is an IETF (Internet Engineering Task Force) specified protocol for a PEP (Policy Enforcement Point) to request policy information from the PDP (Policy Decision Point). However, it is not required that these messages are COPS messages.

It is also to be noted that the steps #2 to #11 are the same if the other communication end-point (not shown) initiates the call release.

As an alternative to the above mentioned sequence of signaling steps, it is also possible that the PCF may be adapted to remove or which removes the request state information already upon receipt of the call release indication from the proxy-CSCF. In that case, the GGSN would not have to send the "Delete Request State" message (step #10), thereby leading to a reduced signaling amount.

According to the second embodiment, a call such as an IP multimedia call, is released by the network if the terminal MS is prevented from doing so. For example, in case the MS is out of the coverage area of the serving Node_B and no handover was successful.

Generally, the RAB is released upon a break in the radio connection or upon an inactivity state of an MS has been monitored and detected by the first communication network layer.

In brief, according to the second embodiment, the radio network controller RNC initiates the radio access bearer (RAB) release procedure. Then, the RAB is released. The SGSN modifies or deactivates (as a kind of modification) the concerned PDP context. The GGSN informs the PCF about the PDP context modification/deactivation. The PCF sends an indication to the proxy-CSCF to release or modify the concerned call. To release the call, the proxy-CSCF sends the message (e.g. a SIP Bye message (SIP=Session Initiation Protocol)) to the mobile station MS as the terminal (which is optional) and to the other communication endpoint. The proxy-CSCF may receive acknowledgments for this message.

Thus, upon RAB release, an inter network layer communication is involved, which takes place via the interface between the communication network layers.

The individual steps of the involved signaling are now explained with reference to FIG. 3.

After a certain time of break in a radio connection or after a certain time of inactivity, the network is enabled to release or modify a call, for example if the terminal MS has left the coverage area. Such network initiated call release or modification is particularly important if charging for the call is based on time.

FIG. 3 illustrates a call release signaling scenario initiated by the network upon detection of an inactivity of the terminal MS.

In step #1, the radio network controller (RNC) detects and/or notices that the radio connection to the MS has broken or the terminal MS has been inactive. Upon detection of this situation, the RNC sends a "RAB Release Request" message to the SGSN.

In a following step #2, the radio access bearer release is performed.

Thereafter, in step #3, the SGSN modifies and/or deactivates the concerned PDP context for the subscriber by sending an "Update PDP Context Request" (in case of a modification, to be explained later) or a "Delete PDP Context Request (in case of deactivation) to the GGSN. The latter case is represented in FIG. 3.

As shown in step #4, the GGSN sends a "Delete Request State" message (including the request ID) to the PCF to remove the request state from the PCF.

In response thereto, the PCF sends in step #5 the "Release" message to the proxy-CSCF to request a call release or modification.

As show in step #6, the proxy CSCF may acknowledge the receipt of the message by sending a "Release Ack" message to the PCF.

In a step #7, the proxy-CSCF (optionally) may send a "Bye" message to the terminal now being for example out of coverage (as the terminal, if out of coverage, may not necessarily receive this message, this message may optionally be sent), and may send the "Bye" message to the communication partner (not shown) of the illustrated terminal MS. As an alternative, the proxy-CSCF may modify the call (not shown). The modification may affect charging for the call.

During steps #8 to #10, the PDP context deactivation procedure (which is known as such) is performed.

In step #11, the terminal MS (optionally, e.g. if not fully out of coverage and some signaling is still possible) and the other endpoint (not shown) may acknowledge the call release by sending an appropriate acknowledgment message (e.g. "200 OK" message).

In FIG. 3, the messages transmitted in step #4 (Delete Request State) may be a COPS message.

Both embodiments have been described in terms of deactivating a concerned PDP context for a call. However, deactivation of the PDP context represents a boundary case of a modification of a PDP context. Thus, instead of deactivation, a modification of the PDP context is also possible.

Such a PDP context modification is performed after RAB release (with reference to FIG. 3) and before RAB release (with reference to FIG. 2). The PDP context as such is preserved in the course of a modification, but (as an example) the QoS parameter guaranteed bit rate is set to zero upon a modification as conceivable in connection with the present invention.

In this situation, (in the second embodiment) the GGSN should send the "Request" message (including request ID and QoS negotiated as parameters) to the PCF. After receiving the request message with the (requested) guaranteed bit rate of zero, the PCF should send the "Release" message to the proxy-CSCF. In connection with the first embodiment (FIG. 2), however, the PCF should, when modifying PDP contexts instead of deactivation, send the "Decision" message having such a content that GGSN modifies the concerned PDP context such that the guaranteed bit rate is set to zero.

Nevertheless, a deactivation of concerned PDP contexts as illustrated in FIGS. 2 and 3, respectively, is optimum for the network resources. That is, since the PDP context is only used for the call, after releasing the call, the PDP context is no longer needed and could therefore be deactivated without causing any trouble.

Further, with regard to FIG. 2, the PDP context deactivation may happen immediately. Alternatively, the GGSN may set a timer when the "Decision" message is received and initiate a PDP context deactivation after the expiry of the timer.

Further, with regard to FIG. 3, call release may happen immediately. Alternatively, The CSCF may set a timer when the release message is received and initiate call release after the expiry of the timer.

In the foregoing, the inter network layer signaling has been described which takes place via the PCF as an interface network element. However, in both embodiments, the communication between the GGSN and proxy-CSCF may be effected without involving the PCF network element. The PCF may be located in the CSCF or in the GGSN. In this case, however, a new interface between GGSN and (proxy) CSCF would have to be defined.

Thus, either a call or a PDP context is released by a network layer, with the release being informed to the other network layer. A call release may affect the PDP context used to carry the call. A PDP context release may affect the call carried on the PDP context. The expression "connection" as used herein above was chosen to describe either a call or a PDP context (or even a part of the PDP context, i.e. a radio access bearer), while the term "communication channel" denotes a PDP context.

Accordingly, as has been described herein above, the present invention is a method for releasing at least a part of a connection in a two-layer communication network comprising a first communication network layer adapted to establish or which establishes a communication channel to a terminal, and a second communication network layer adapted to establish or which establishes an application layer connection, the method comprising the steps of: deciding in one of the first and second communication network layers that at least the part of the connection associated to the terminal is to be released, and forwarding the decision from the one of the communication network layers in which the decision has been taken, to the other of the communication network layers via an interface between the first and second communication network layers. Accordingly, each communication network layer has a knowledge of the necessity to release a connection and is enabled to initiate suitable measures in order not to waste network capacities for a connection call which is or can no longer be active. The present invention also relates to a correspondingly operated communication network. Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
deciding, in one of a first communication network layer configured to establish a communication channel to a terminal and a second communication network layer based on Internet protocol and configured to establish a call to the terminal, that at least a part of a connection associated with the terminal is to be released, wherein the connection is a session, wherein the first communication network layer includes at least one of a gateway general packet radio service support node, a serving general packet radio service support node, and a radio access network;
forwarding the decision from the one of the communication network layers in which the decision has been taken, to the other of the communication network layers via an interface between the first and second communication network layers;
releasing an established session to the terminal communicating in the session;
modifying a communication channel used for the session, wherein the modification affects at least one parameter of a set of parameters defining the connection, and the at least one parameter is the quality of service parameter guaranteed bit rate, and the guaranteed bit rate is modified to be set to zero; and
monitoring an inactivity state of the terminal by the first communication network layer,
wherein, when detecting an inactivity state, the decision concerning the release is taken by the first communication network layer, and forwarded from the first to the second communication network layer.

2. A method according to claim 1, wherein:
the second communication network layer is an internet protocol multimedia subsystem.

3. A method according to claim 1, wherein:
the terminal is a mobile station or a user equipment.

4. A method according to claim 1, wherein:
the interface between the first and the second communication network layers is constituted by a network functional entity.

5. A method according to claim 4, wherein:
the network functional entity is a policy control function.

6. A method according to claim 1, wherein:
the modification is a deactivation.

7. A method according to claim 1, wherein:
the modification affects charging for the communication channel.

8. A method according to claim 1, wherein:
the communication channel is represented by using a packet data protocol context.

9. A method according to claim 1, comprising:
releasing or modifying the communication channel; and
modifying the session carried on the communication channel.

10. A method according to claim 9, wherein:
the modification is a release.

11. A method according to claim 9, wherein:
the modification affects charging for the session.

12. A method according to claim 9, wherein:
the communication channel is represented by using a packet data protocol context.

13. A method according to claim 1, further comprising:
receiving, from the terminal, a request for the two-layer communication network to release the terminal from the session; and wherein
the decision concerning the release is taken by the second communication network layer based on the release request from the terminal, and forwarded from the second to the first communication network layer.

14. A method according to claim 1, wherein:
the inactivity state is represented by a break in a radio connection.

15. A system comprising:
a terminal configured to communicate in a call via a connection with a two-layer communication network, the network comprising a first communication network layer configured to establish a communication channel to the terminal communicating in the call, and a second communication network layer based on Internet protocol and configured to establish the call to the terminal, wherein the connection is a session, wherein the first communication network layer includes at least one of a gateway general packet radio service support node, a serving general packet radio service support node, and a radio access network, and wherein the system is configured to:
decide in one of the first and second communication network layers that at least a part of the connection associated with the terminal is to be released;
forward the decision from the one of the communication network layers in which the decision has been taken, to the other of the communication network layers via an interface between the first and second communication network layers;
releasing an established session to the terminal communicating in the session; and
modifying a communication channel used for the session, wherein the modification affects at least one parameter of a set of parameters defining the connection, and the at least one parameter is the quality of service parameter guaranteed bit rate, and the guaranteed bit rate is modified to be set to zero; and
monitoring an inactivity state of the terminal by the first communication network layer,
wherein, when detecting an inactivity state, the decision concerning the release is taken by the first communication network layer, and forwarded from the first to the second communication network layer.

* * * * *